W. S. TYLER.
COUPLING.
APPLICATION FILED APR. 15, 1912.
1,162,417.
Patented Nov. 30, 1915.
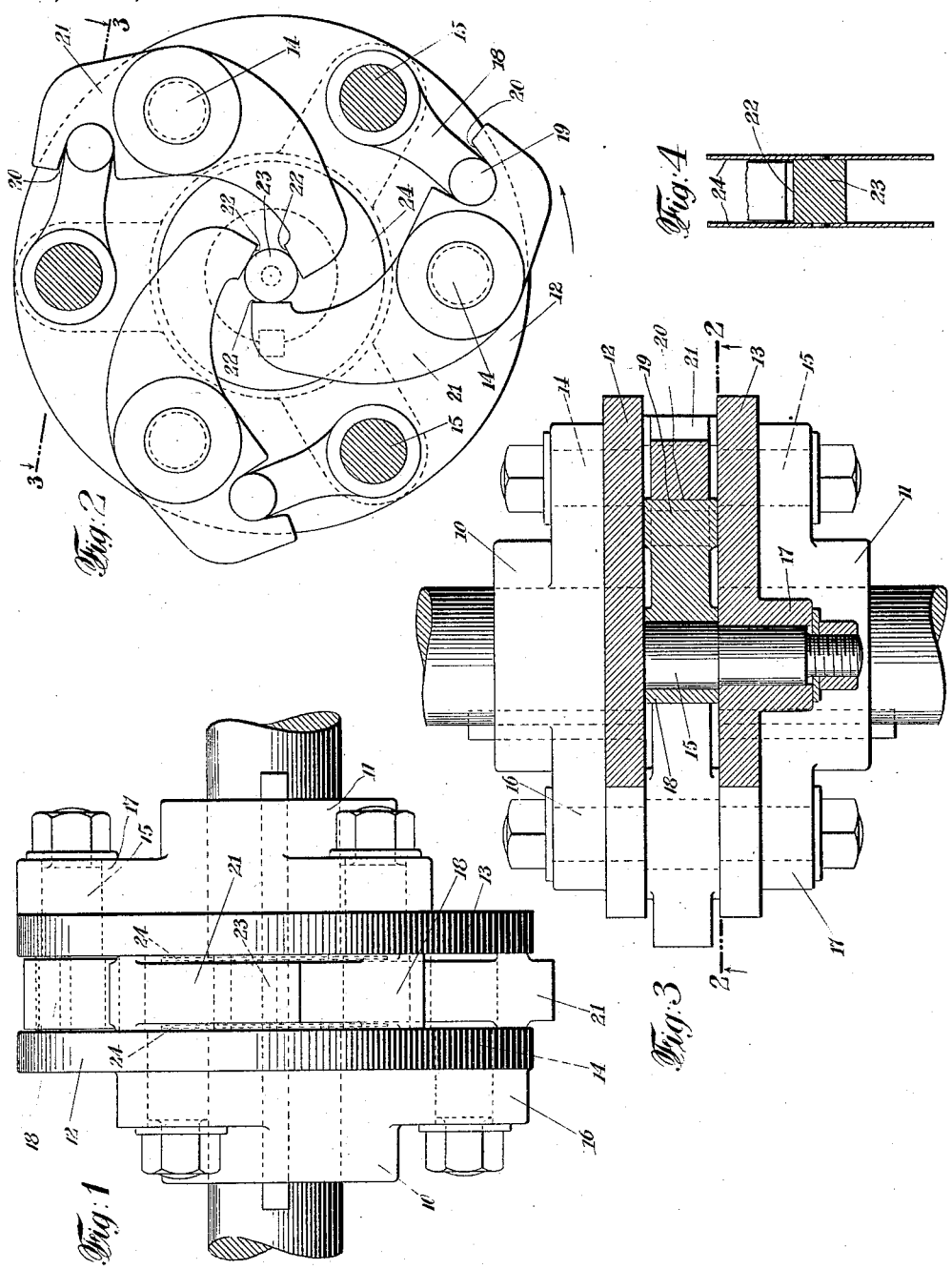
Witnesses:
John E. Prager
A. Worden Gibbs
Inventor
William S. Tyler
By his Attorney

UNITED STATES PATENT OFFICE.

WILLIAM S. TYLER, OF NEWARK, NEW JERSEY.

COUPLING.

1,162,417. Specification of Letters Patent. Patented Nov. 30, 1915.

Application filed April 15, 1912. Serial No. 690,799.

*To all whom it may concern:*

Be it known that I, WILLIAM S. TYLER, citizen of the United States, and a resident of Newark, in the county of Essex and State of New Jersey, have invented certain new and useful Improvements in Couplings, of which the following is a specification.

The invention relates to a device for connecting two rotatable pieces of apparatus, as a driving and driven member, or two lines of shafting.

It has for its object to provide a coupling of simple and substantial construction, and which will permit of a slight eccentricity between the shafts, due to various causes.

The nature of the invention will best be understood when described in the accompanying drawings, in which—

Figure 1 is a front elevation of the coupling. Fig. 2 is a vertical section through the coupling, taken on the line 2—2, Fig. 3. Fig. 3 is a horizontal section taken on the line 3—3, Fig. 2. Fig. 4 is a detail of the equalizing member.

Similar characters of reference designate corresponding parts throughout the several views.

Referring to the drawings, 10 and 11 designate the two members of the coupling, either one of which may be the driving member. As shown in the drawings, 10 is the driving member and 11 the driven member, the said members consisting of coöperating flanges 12 and 13 respectively, one carrying suitable arms and the other levers, as will hereinafter be more fully set forth. Projecting inwardly from the faces of these flanges and suitably spaced thereon, are studs 14 and 15 respectively, which are mounted in corresponding bearings 16 and 17 of the flanges. Upon the latter studs are pivotally mounted arms 18 terminating in rounded ends 19. These ends 19 are adapted to engage a corresponding grooved seat or recess 20 at one end of levers 21 which are fulcrumed on the studs 14 and whose other end terminates in a jaw-piece 22. The inner arms of these levers 21 are directed toward the center of the flanges, and their respective jaw-pieces 22 are preferably arranged to bear upon an equalizing cylinder 23, being held in place through the action of the driving force on the other end of lever 21. This maintains the levers 21 in proper position to drive the arms 18 and thereby the other half of the coupling. The free ends of these levers, however, may be suitably shaped to bear directly upon one another.

Should the two shafts be not entirely in line with each other, the corresponding pairs of engaging arms and levers are raised or lowered accordingly, the floating cylinder 23 accommodating itself to this displacement and serving to transmit the shifting movement. The downward movement of levers 21 is limited by their contact with the arm of a succeeding couple, and the equalizing cylinder 23 is prevented from possible dropping out between the jaws by means of flanges 24 secured to the ends of the said cylinder and which are of a diameter sufficient to prevent their passing between the inwardly projecting studs. Differences in alinement will thus be readily accommodated; and the parts, furthermore, are positive acting and any looseness or wear will not affect the operation of the couple, nor produce noise.

I claim:—

1. A coupling, comprising: a driving member, and a driven member; arms pivotally mounted upon one of said members and terminating in rounded ends; two-armed levers fulcrumed on the other member, one arm of each of said levers being provided with a suitable recess engaging one of the said rounded ends, and the other arms of said levers terminating in suitable jaws; and a floating cylindrical member upon which said jaws bear.

2. A coupling, comprising: two individual shafts terminating in oppositely-disposed flanges; studs extending inwardly from said flanges; arms mounted about the studs of one flange and terminating in rounded ends; levers fulcrumed on the studs of the other flange, one arm of each of said levers being provided with a suitable recess engaging one of the said rounded ends, and the other arms of which terminate in suitable jaws; and a floating cylindrical member, provided with end flanges between the said coupling flanges, and upon which the said jaws bear.

Signed at New York, in the county of New York, and State of New York, this 13th day of April, A. D. 1912.

WILLIAM S. TYLER.

Witnesses:
LAURA E. SMITH,
FRED'K F. SCHUETZ.